US011423153B2

United States Patent
Rose

(10) Patent No.: US 11,423,153 B2
(45) Date of Patent: Aug. 23, 2022

(54) DETECTION OF MALICIOUS OPERATING SYSTEM BOOTING AND OPERATING SYSTEM LOADING

(71) Applicant: Raytheon Company, Waltham, MA (US)

(72) Inventor: Daniel S. Rose, Salado, TX (US)

(73) Assignee: Raytheon Company, Waltham, MA (US)

( * ) Notice: Subject to any disclaimer, the term of this patent is extended or adjusted under 35 U.S.C. 154(b) by 160 days.

(21) Appl. No.: 16/996,529

(22) Filed: Aug. 18, 2020

(65) Prior Publication Data

US 2022/0058271 A1 Feb. 24, 2022

(51) Int. Cl.
| | |
|---|---|
| *G06F 21/00* | (2013.01) |
| *G06F 21/57* | (2013.01) |
| *G06F 9/445* | (2018.01) |
| *G06F 21/54* | (2013.01) |
| *G06F 9/4401* | (2018.01) |
| *G06F 21/56* | (2013.01) |

(52) U.S. Cl.
CPC .......... *G06F 21/575* (2013.01); *G06F 9/4406* (2013.01); *G06F 9/44505* (2013.01); *G06F 21/54* (2013.01); *G06F 21/566* (2013.01); *G06F 21/577* (2013.01)

(58) Field of Classification Search
None
See application file for complete search history.

(56) References Cited

U.S. PATENT DOCUMENTS

| | | | | |
|---|---|---|---|---|
| 2007/0234061 | A1* | 10/2007 | Teo ....................... | G06F 21/566 713/178 |
| 2007/0288738 | A1* | 12/2007 | Dale ..................... | G06F 21/575 713/2 |
| 2007/0288739 | A1* | 12/2007 | Dale ..................... | G06F 21/575 713/2 |
| 2007/0288740 | A1* | 12/2007 | Dale ..................... | G06F 9/4405 713/2 |

(Continued)

OTHER PUBLICATIONS

Maybaum, Markus; Toelle, Jens. ARMing the Trusted Platform Module pro-active system integrity monitoring focussing on peer system notification. MILCOM 2015—2015 IEEE Military Communications Conference, https://ieeexplore.ieee.org/stamp/stamp.jsp?tp=&arnumber=7357671 (Year: 2015).*

(Continued)

*Primary Examiner* — Jeremiah L Avery
(74) *Attorney, Agent, or Firm* — Schwegman Lundberg & Woessner, P.A.

(57) ABSTRACT

A system detects deviation from a computer operating system boot and operating system load. The system identifies approved operating system boot modules, approved operating system load modules, essential operating system boot components, and essential operating system configuration information, which are then hashed to create an operating system boot profile. The operating system boot modules and the operating system load modules are then executed to start the operating system. The operating system boot profile is used to verify that that there has not be any deviation from the start of the operating system.

20 Claims, 4 Drawing Sheets

(56) References Cited

U.S. PATENT DOCUMENTS

| | | | | |
|---|---|---|---|---|
| 2007/0288761 A1* | 12/2007 | Dale | ................... | G06F 21/575 |
| | | | | 713/189 |
| 2007/0288762 A1* | 12/2007 | Dale | ................... | G06F 21/755 |
| | | | | 713/189 |
| 2012/0254602 A1* | 10/2012 | Bhansali | ................ | G06F 21/31 |
| | | | | 713/2 |
| 2018/0089436 A1* | 3/2018 | Smith | ................... | G06F 21/575 |
| 2020/0104495 A1* | 4/2020 | Schack | ................ | H04L 9/3247 |
| 2021/0286530 A1* | 9/2021 | Suryanarayana | ..... | G06F 3/0664 |

OTHER PUBLICATIONS

Kai, Tang et al. The Secure Boot of Embedded System Based on Mobile Trusted Module. 2012 Second International Conference on Intelligent System Design and Engineering Application. https://ieeexplore.ieee.org/stamp/stamp.jsp?tp=&arnumber=6173454 (Year: 2012).*

* cited by examiner

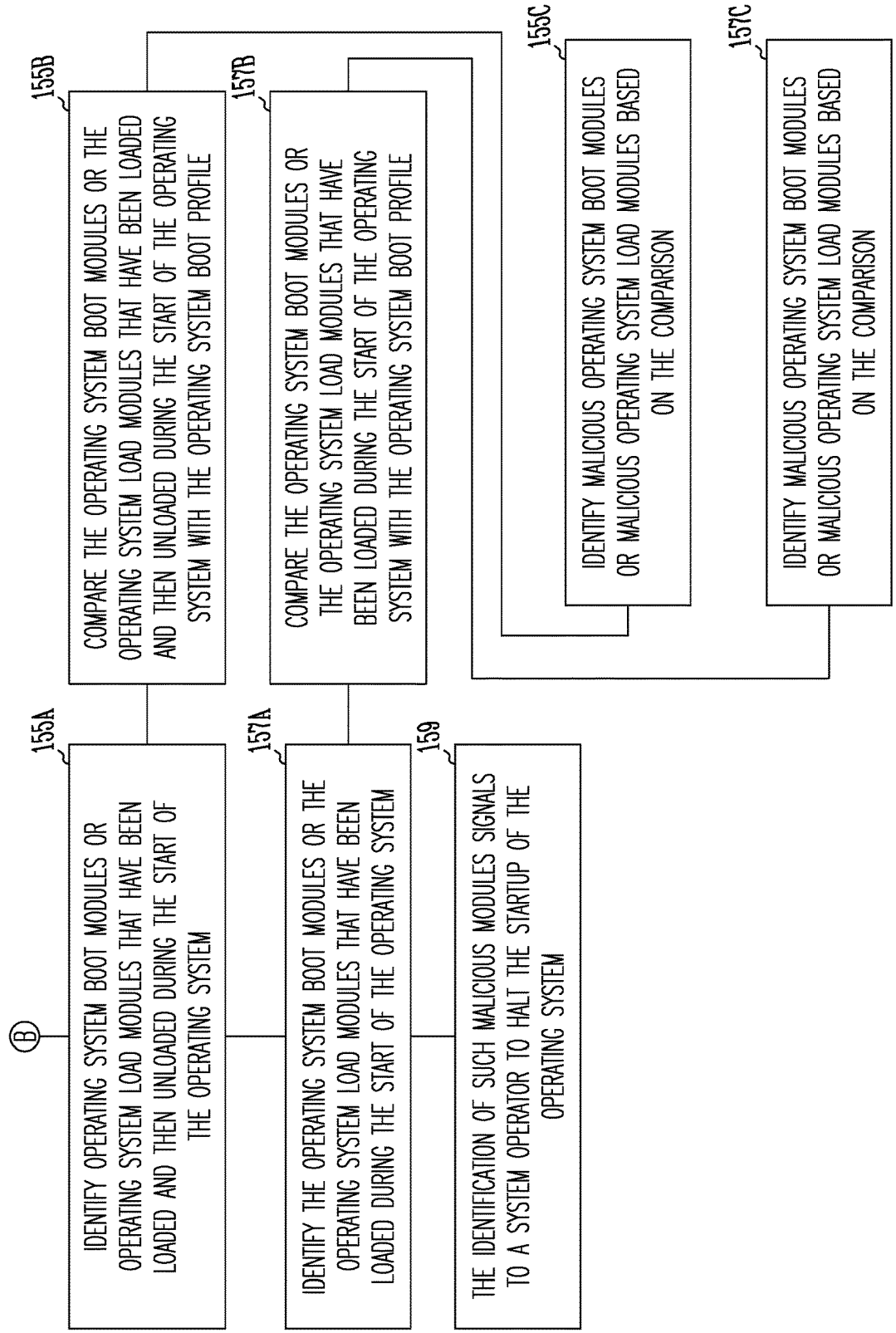

DETECTION OF MALICIOUS OPERATING SYSTEM BOOTING AND OPERATING SYSTEM LOADING

TECHNICAL FIELD

The present disclosure relates to detection of malicious computer operating system booting and computer operating system loading.

BACKGROUND

In order to protect the integrity of a computer system, prevention and detection of malicious deviation from normal operating system boot and early operation load can be important. Generally, a computer system must execute firmware that loads operating system boot modules and early operating system load modules before the system can become fully operationally. This series of events however exposes a substantial attack surface for insertion of additional load modules and drivers, or the manipulation of existing modules used during boot.

While the current state of the art addresses securing the integrity of a computer system through use of secure boot and early driver load detection, there are still weak points that can exploited by an adversary. For example, operating systems have kernel code that validates driver code before it can execute. Protection of the system relies on the security of this validation code. For instance, if a developer utilizes global variables that reside in memory and that can be modified by an adversary, this code could be disabled. Other similar attacks may be possible. As another example, operating system developers have processes to approve kernel drivers via a signing process. An adversary may be able to create a kernel driver that passes this approval process by sufficiently obfuscating the workings of the driver. In this way, an adversary could load a malicious driver with the approval of the operating system.

BRIEF DESCRIPTION OF THE DRAWINGS

FIGS. 1A, 1B, and 1C are a block diagram of a system and process for the detection of malicious computer operating system booting and computer operating system loading.

DETAILED DESCRIPTION

In the following description, for purposes of explanation, numerous specific details are set forth in order to provide a thorough understanding of the various aspects of different embodiments of the present invention. It will be evident, however, to one skilled in the art that the present invention may be practiced without all the specific details and/or with variations, permutations, and combinations of the various features and elements described herein.

An embodiment of the present disclosure has a three-fold runtime system. A first portion is implemented in a pre-deployment environment, and it includes identifying and hashing essential boot components and configuration information. This creates an operating system boot profile. Then, at runtime, a boot module confirms or verifies the operating system boot profile of the operating system load modules. Thereafter, the operating system load module checks modules that have already been loaded into system memory. The system then uses reverse engineered knowledge of kernel data structures and memory layout to search directly for remnants of modules that were loaded and unloaded before the operating system has finished its startup procedures.

Using this embodiment, the system can confirm that only approved operating system boot modules and operating system load modules were used at any point in the operating system load and early operating system operation, that is, before the operating system is fully operational. This detection of modules that were loaded then unloaded before the operating system was fully operational is a forensic analysis. This forensic analysis is effective because malicious attacks will often load a module early, which injects code elsewhere or alters kernel memory in order to compromise the operating system's integrity. Consequently, detecting evidence of ephemeral module activity is valuable in protecting the system.

To address these issues, an embodiment incorporates heterogeneous boot aspects into the operating system boot profile. Select modules, boot paths, and system configuration files are stored and hashed into the operating system boot profile, and this operating system boot profile is used for validation. It is noted that operating system memory forensics requires in-depth research into the operating system boot and early load process of the operating system in order to determine what is useful evidence of activity. It is further noted that once identified, finding ways to consistently identify these previous signs of activity in memory during runtime is not always straightforward. In addition to boot and load module forensics, investigation into operation system kernel data structures for evidence of tampering with protection systems (e.g. data execution prevention (DEP), address space layout randomization (ASLR), loading untrusted fonts and other binaries that could be executable) is valuable for detection of malicious activity.

Figure 1A:
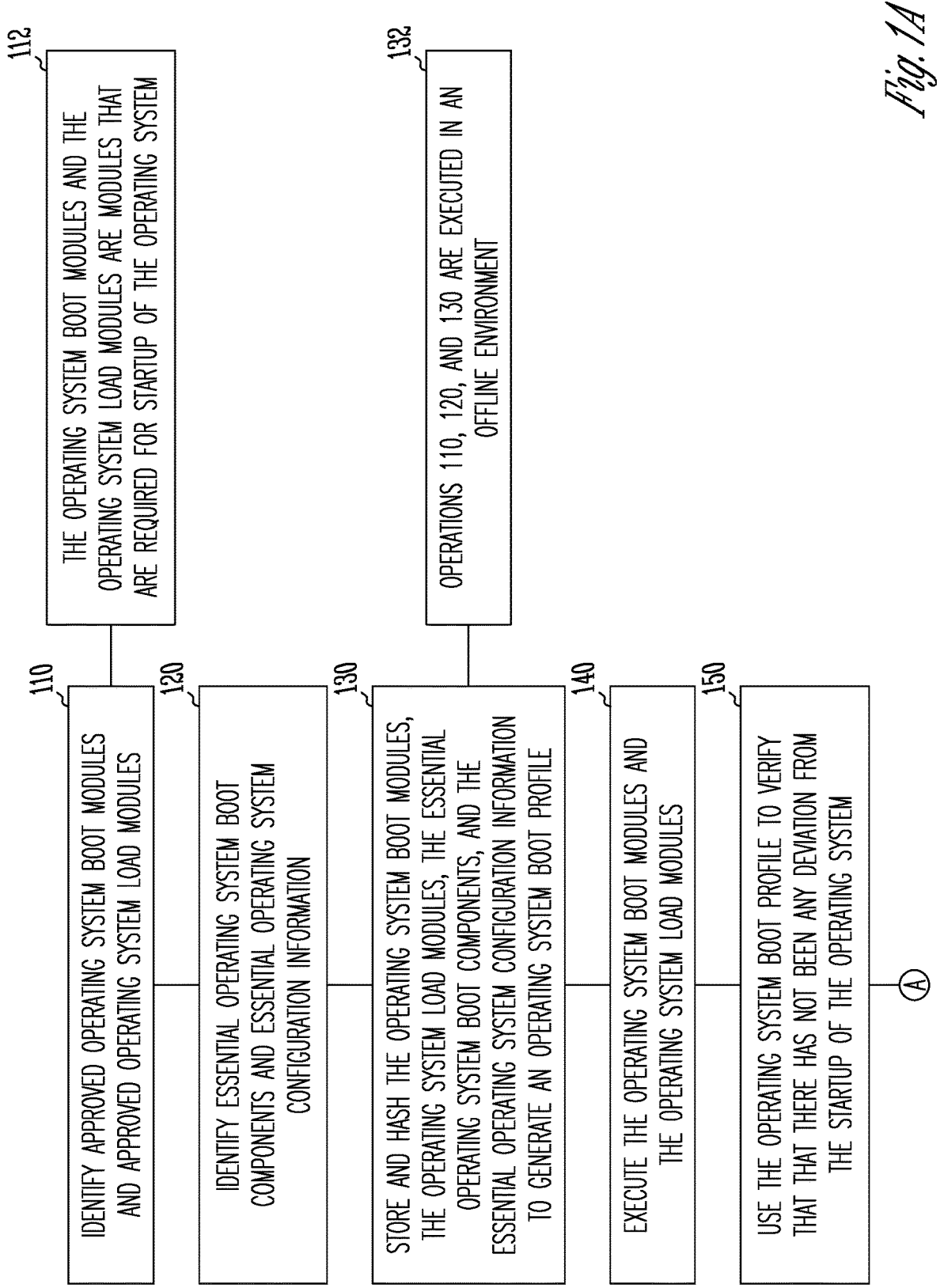
Figure 1B:
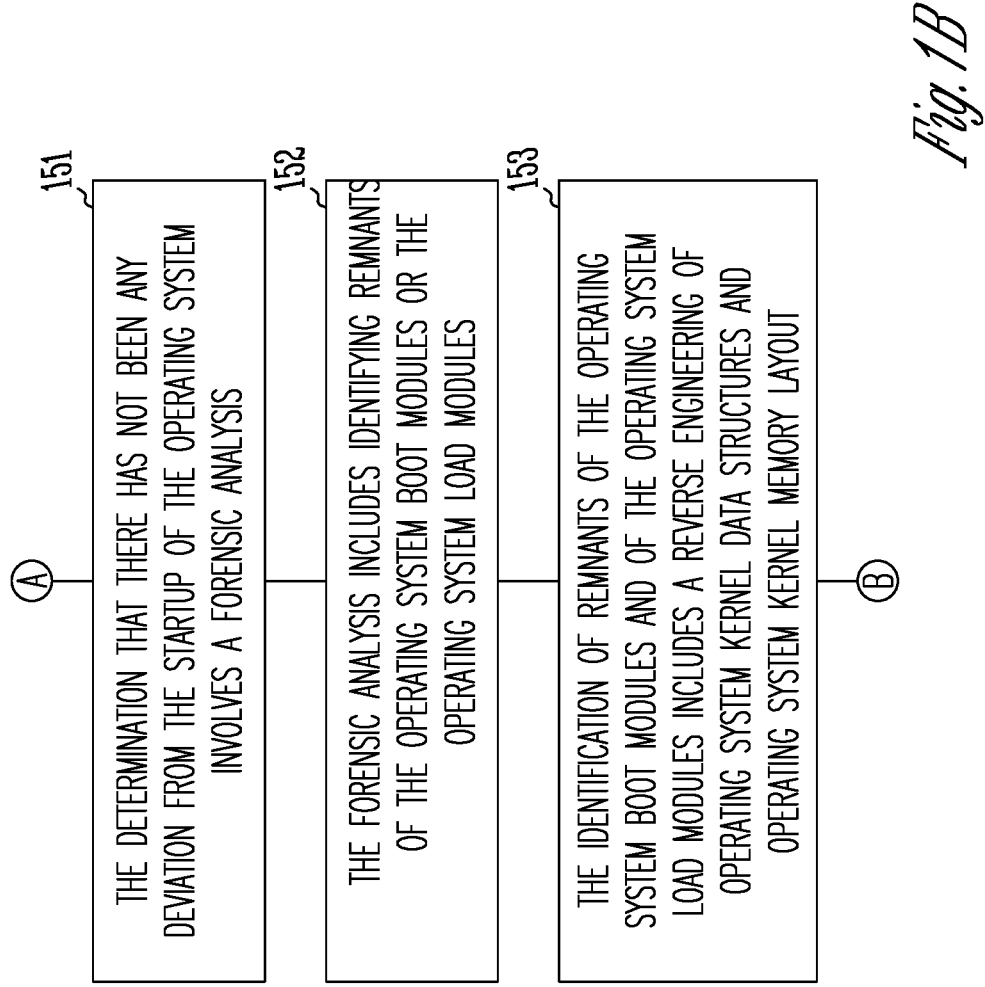

FIG. 1 is a flowchart of an example embodiment of a process for detecting malicious computer operating system booting and computer operating system loading. FIG. 1 includes a plurality of process blocks 110-159. Though arranged substantially serially in the example of FIG. 1, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIG. 1, at 110, a plurality of approved operating system boot modules and a plurality of approved operating system load modules are identified. This can be performed by consulting the manuals and other documentation associated with the computer system, and can be performed by a system operator, can be performed automatically by the system, and/or can be performed in an artificially intelligent manner. As indicated at 112, the plurality of operating system boot modules and the plurality of operating system load modules are operating system boot modules and operating system load modules that are required for startup of the operating system. These modules are "approved" in the sense that they are legitimate and valid modules, are known to the owners of the operating system, and they are not malicious or pernicious modules that have somehow infiltrated the computer system. The list of approved operating system boot modules and operating system load modules can be customized/configured by the system administrator based on the security requirements for a given environment. At 120, in a manner similar to operation 110, essential operating system boot components and essential operating system configuration information are identified. Essential operating system boot components and essential operating system configuration information are components and information that are minimally required in order to bring up the computer operating system to a minimal, fully operational level. These can include a configuration file, a boot configuration database, and other data files.

At 130, the system hashes the operating system boot modules, the operating system load modules, the essential operating system boot components, and the essential operating system configuration information. This hashing generates an operating system boot profile, which also contains some of the un-hashed information related to these files. As indicated at 132, operations 110, 120, and 130 are executed in an offline environment prior to the bringing up of the operating system.

At 140, the operating system boot modules and the operating system load modules are executed, and this execution brings up the operating system. Then, at 150, the operating system boot profile is used to verify that that there has not be any deviation from the start of the operating system, which would indicate that a pernicious or malicious module somehow found its way into the system. If there is a deviation from the normal, expected startup of the operating system, it is possible that a malicious attack has occurred on the system, and the operators of the system should bring the system down and further investigate the deviation.

More specifically, at 151, the use of the operating system boot profile to verify that there has not been any deviation from the startup of the operating system involves a forensic analysis. Such a forensic analysis involves searching the system memory for modules that were present during the start of the operating system, but which are no longer present in the system. Such modules could be, but not necessarily are, malicious software. Consequently, further investigation is required. In an embodiment, at 152, the forensic analysis includes identifying remnants of the operating system boot modules or the operating system load modules. More specifically, at 153, the identification of remnants of the operating system boot modules and of the operating system load modules includes a reverse engineering of operating system kernel data structures and operating system kernel memory layout.

The operating system keeps kernel data structures in memory that hold the list of currently loaded modules. Some details of these structures are undocumented. Likewise, when a module is loaded and then unloaded, the operating system keeps details related to these operations in undocumented structures and locations in memory. In order to find the location of these kernel structures and the details about their structure, a reverse engineer can begin by finding a consistent reference point in memory. Then, one can search kernel memory for substrings of known boot or load modules or their paths. Once found, testing can be done to conclude these portions of memory are filled in during boot and system load. At this point, the reverse engineer has a firm reference point and can calculate an offset to these kernel data structures in memory that have been confirmed to be part of the boot and load process. The final step is to understand the kernel data structures themselves in order to find important memory offsets for the data desired. This can be done by analysis of memory in close proximity to the strings found in order to identify string lengths and pointers to other tables with related information. Once the above information is collected and confirmed, it can be built into a module that calculates the relative offsets from the reference point and gleans the data to be compared with the data in the boot profile. Similar reverse engineering activities can be undertaken with respect to other kernel information that is sought.

The identification of the remnants of the operating system boot modules or of the operating system load modules can further be accomplished in at least two different ways. In a first embodiment, at 155A, operating system boot modules or operating system load modules that have been loaded and then unloaded during the start of the operating system are identified. At 155B, the operating system boot modules or the operating system load modules that have been loaded and then unloaded during the start of the operating system are compared with the operating system boot profile. At 155C, malicious operating system boot modules or malicious operating system load modules are identified based on the comparison. In short, if a hash value, file name, and path of the operating system boot modules or the operating system load modules does not sync up with the hash values in the operating system boot profile, this is an indication that a deviation has occurred such as the infiltration of malware into the computer system.

In a second embodiment, at 157A, the operating system boot modules or the operating system load modules that have been loaded during the start of the operating system are identified. At 157B, the operating system boot modules or the operating system load modules that have been loaded during the start of the operating system are compared with the operating system boot profile. At 157C, malicious operating system boot modules or malicious operating system load modules are identified based on the comparison. Whether malicious modules are identified via operations 155A-155C or through 157A-157C, the identification of such malicious modules signals to a system operator at 159 to halt the start of the operating system. The system operator can then investigate the details of the startup of the operating system.

Figure 2:
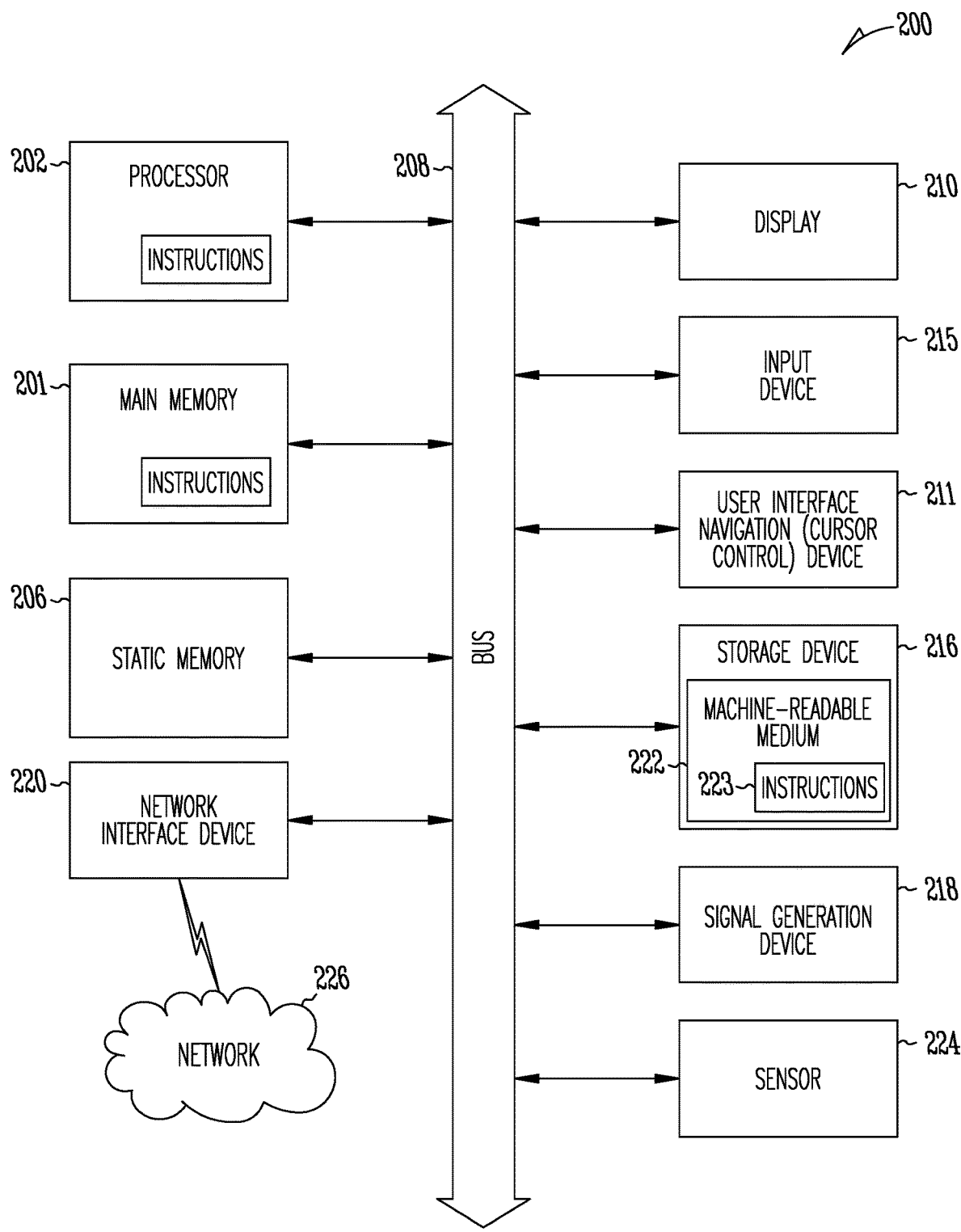
FIG. 2 is a block diagram of a computer architecture upon which one or more embodiments of the present disclosure can execute.

FIG. 2 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU), a graphics processing unit (GPU) or both), a main memory 201 and a static memory 206, which communicate with each other via a bus 208. The computer system 200 may further include a display unit 210, an alphanumeric input device 215 (e.g., a keyboard), and a user interface (UI) navigation device 211 (e.g., a mouse). In one embodiment, the display, input device and cursor control device are a touch screen display. The computer system 200 may additionally include a storage device 216 (e.g., drive unit), a signal generation device 218 (e.g., a speaker), a network interface device 220, and one or more sensors 224, such as a global positioning system sensor, compass, accelerometer, or other sensor.

The storage device 216 includes a machine-readable medium 222 on which is stored one or more sets of instructions and data structures (e.g., software 223) embodying or utilized by any one or more of the methodologies or functions described herein. The software 223 may also reside, completely or at least partially, within the main memory 201 and/or within the processor 202 during execution thereof by the computer system 200, the main memory 201 and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 223 may further be transmitted or received over a communications network 226 using a transmission medium via the network interface device 220 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A process to detect deviation from an operating system boot and an operating system load comprising: (a) identifying with a computer processor a plurality of approved operating system boot modules, a plurality of approved operating system load modules, essential operating system boot components, and essential operating system configuration information; (b) generating an operating system boot profile based on a hashing of the operating system boot modules, the operating system load modules, and at least one of the essential operating system boot components or the essential operating system configuration information; (c) executing the operating system boot modules and the operating system load modules to start the operating system; and (d) using the operating system boot profile to verify that there has not been any deviation from the start of the operating system.

2. The process of claim 1, wherein using the operating system boot profile to verify that there has not been any deviation from the start of the operating system comprises a forensic analysis.

3. The process of claim 2, wherein the forensic analysis comprises identifying remnants of the operating system boot modules or the operating system load modules.

4. The process of claim 3, wherein the identifying remnants of operating system boot modules and of the operating system load modules comprises reverse engineering of operating system kernel data structures and operating system kernel memory layout.

5. The process of claim 3, wherein the identifying remnants of the operating system boot modules or of the operating system load modules comprises:
   identifying the operating system boot modules or the operating system load modules that have been loaded and then unloaded during the start of the operating system;
   comparing the operating system boot modules or the operating system load modules that have been loaded and then unloaded during the start of the operating system with the operating system boot profile; and
   identifying malicious operating system boot modules or malicious operating system load modules based on the comparison.

6. The process of claim 3, wherein the identifying remnants of the operating system boot modules or of the operating system load modules comprises:
   identifying the operating system boot modules or the operating system load modules that have been loaded during the start of the operating system;
   comparing the operating system boot modules or the operating system load modules that have been loaded during the start of the operating system with the operating system boot profile; and
   identifying malicious operating system boot modules or malicious operating system load modules based on the comparison.

7. The process of claim 5, comprising halting the start of the operating system when the malicious operating system boot modules or the malicious operating system load modules have been identified.

8. The process of claim 1, wherein operations (a) and (b) are executed in an offline environment.

9. The process of claim 1, wherein the plurality of operating system boot modules and the plurality of operating system load modules comprises the operating system boot modules and the operating system load modules that are required for startup of the operating system.

10. A non-transitory computer readable medium comprising instructions that when executed by a processor execute a process comprising: (a) identifying with a computer processor a plurality of approved operating system boot modules, a plurality of approved operating system load modules, essential operating system boot components, and essential operating system configuration information; (b) generating an operating system boot profile based on a hashing of the operating system boot modules, the operating system load modules, and at least one of the essential operating system boot components or the essential operating system configuration information;

(c) executing the operating system boot modules and the operating system load modules to start the operating system; and (d) using the operating system boot profile to verify that there has not been any deviation from the start of the operating system.

11. The non-transitory computer readable medium of claim 10, wherein using the operating system boot profile to verify that there has not been any deviation from the start of the operating system comprises a forensic analysis.

12. The non-transitory computer readable medium of claim 11, wherein the forensic analysis comprises instructions for identifying remnants of the operating system boot modules or the operating system load modules.

13. The non-transitory computer readable medium of claim 12, wherein the identifying remnants of operating system boot modules and of the operating system load modules comprises instructions for reverse engineering of operating system kernel data structures and operating system kernel memory layout.

14. The non-transitory computer readable medium of claim 12, wherein the identifying remnants of the operating system boot modules or of the operating system load modules comprises instructions for:
identifying the operating system boot modules or the operating system load modules that have been loaded and then unloaded during the start of the operating system;
comparing the operating system boot modules or the operating system load modules that have been loaded and then unloaded during the start of the operating system with the operating system boot profile; and
identifying malicious operating system boot modules or malicious operating system load modules based on the comparison.

15. The non-transitory computer readable medium of claim 12, wherein the identifying remnants of the operating system boot modules or of the operating system load modules comprises:
identifying the operating system boot modules or the operating system load modules that have been loaded during the start of the operating system;
comparing the operating system boot modules or the operating system load modules that have been loaded during the start of the operating system with the operating system boot profile; and
identifying malicious operating system boot modules or malicious operating system load modules based on the comparison.

16. The non-transitory computer readable medium of claim 15, comprising instructions for halting the start of the operating system when the malicious operating system boot modules or the malicious operating system load modules have been identified.

17. The non-transitory computer readable medium of claim 10, wherein operations (a), (b), (c), and (d) are executed in an offline environment.

18. A system comprising: a computer processor; and a memory coupled to the computer processor; wherein the computer processor is operable for: (a) identifying with a computer processor a plurality of approved operating system boot modules, a plurality of approved operating system load modules, essential operating system boot components, and essential operating system configuration information; (b) generating an operating system boot profile based on a hashing of the operating system boot modules, the operating system load modules, and at least one of the essential operating system boot components or the essential operating system configuration information; (c) executing the operating system boot modules and the operating system load modules to start the operating system; and (d) using the operating system boot profile to verify that there has not been any deviation from the start of the operating system.

19. The system of claim 18, wherein using the operating system boot profile to verify that there has not been any deviation from the start of the operating system comprises identifying remnants of the operating system boot modules or the operating system load modules.

20. The system of claim 18, wherein the plurality of operating system boot modules and the plurality of operating system load modules comprises the operating system boot modules and the operating system load modules that are required for startup of the operating system.

* * * * *